United States Patent [19]

Paul et al.

[11] Patent Number: 5,280,984
[45] Date of Patent: Jan. 25, 1994

[54] WALK THROUGH BOOT ASSEMBLY AND METHOD

[75] Inventors: Jeffery F. Paul, Union City; David M. Yun, Fremont, both of Calif.

[73] Assignee: Paccar Inc., Bellevue, Wash.

[21] Appl. No.: 955,408

[22] Filed: Oct. 2, 1992

[51] Int. Cl.$^5$ .............................................. B60P 3/32
[52] U.S. Cl. ...................................... 296/1.1; 296/166
[58] Field of Search .................. 296/1.1, 166; 105/8.1, 105/9, 15, 18

[56] References Cited

U.S. PATENT DOCUMENTS

| | | | |
|---|---|---|---|
| 3,844,603 | 10/1974 | Bjork et al. | 296/166 |
| 3,853,348 | 12/1974 | Bjork et al. | 296/166 |
| 4,222,605 | 9/1980 | Engelhard | 296/166 |
| 4,294,485 | 10/1981 | Engelhard | 296/166 |
| 4,940,278 | 7/1990 | LePere | 296/166 |

*Primary Examiner*—Joseph D. Pape
*Attorney, Agent, or Firm*—Flehr, Hohbach, Test, Albritton & Herbert

[57] ABSTRACT

A boot assembly (10) and method for lining at least a portion of the periphery of a passageway between two compartments (4, 6) of a vehicle (8). The boot assembly (10) includes a boot body portion (16) formed to extend between the securement devices (12, 14) having opposed, first and second shoulders (24, 26). The securement devices are mounted proximate an opening formed in each opposed wall of the two compartments (4, 6). A retaining structure (20, 22) is provided on the body portion (16) to secure the body portion (16) to the securement devices (12, 14). The retaining structure (20, 22) includes a first lip portion (34) and a spaced apart second lip portion (36). The method for lining at least a portion of the periphery of a passageway between two compartments of a vehicle includes the steps of providing a boot assembly (10), inserting a first lip portion (34) of the boot into interengagement with a first shoulder (24) of a securement channel (12, 14), and deforming the second boot lip portion (36) to force the second lip portion (36) past the second channel shoulder (26) by rotating the retaining structure (20, 22) about the interengaged first lip portion (34) and first shoulder (24) until the second lip portion (36) passes beyond and resiliently engages the second shoulder (26).

19 Claims, 3 Drawing Sheets

WALK THROUGH BOOT ASSEMBLY AND METHOD

TECHNICAL FIELD

In general, the present invention relates to a boot assembly for vehicles. More particularly, the present invention relates to a boot assembly for lining the periphery of a passageway between two components of a vehicle, such as, a truck cab and sleeper box.

BACKGROUND ART

With some vehicles the driver and passenger enclosure is provided by separate units which are joined together. Thus, cab and sleeper units of a truck provide one example of such a vehicle. The cab and sleeper are typically independently bolted or secured to the vehicle chassis. During operation, the truck cab and sleeper box move relative to one another as the chassis twists in response to travel across uneven ground. To accommodate this relative movement, the cab and sleeper are generally separated by a gap of up to three inches. The cab and sleeper units typically have opposed walls which are formed with an opening for convenient passenger access between the compartments. A weather seal is provided between the cab and sleeper to prevent moisture from entering the separation gap and passing into the passenger compartment when the vehicle is exposed to either elements.

One type of weather seal used with vehicles is a rubber boot. Mounting frames formed for retaining the rubber boot are secured to the opposed walls of the cab and sleeper units. Several attachment screws secure the rubber boot to the opposed mounting frames, substantially enclosing the separation between the adjacent units. A compression ring is often included to evenly distribute the forces which are exerted by the attachment screws. The rubber boot protects the interior of the passenger compartment by substantially preventing water and debris from passing through the aligned openings in the opposed walls, cab and sleeper box walls.

Several fastener-receiving holes are formed in the boot, with the attachment screws being inserted into the holes to mount the boot to the cab and sleeper units. When the vehicle is exposed to the elements, moisture may seep around the screws and through the holes formed in the boot. The moisture may then collect within the gap and pass into the interior of the vehicle, damaging the upholstery and potentially inducing the formation of rust. During operation of the vehicle, the boot will partially absorb the forces exerted by the relative movement of the cab and sleeper units. However, the vibration of the chassis and the forces exerted on the boot by the motion of the cab and sleeper units may slightly enlarge the size of the fastener-receiving holes, increasing the amount of moisture entering the passenger compartments.

The forces applied to the boot and attachment screws during operation may additionally gradually loosen the screws, with the rubber boot eventually becoming separated from the mounting frames. The released portions of the boot must then be secured to the mounting frame, or if necessary the boot must be replaced. Unless the driver has access to the tools required for replacing the seal, the driver must return the vehicle to an appropriate service facility if the boot loosens or pulls free during operation. Thus, maintenance, repair and replacement of the rubber boot assembly can be a time consuming interruption which may potentially significantly delay the truck driver.

A flexible boot assembly which is secured to the adjacent compartments without the use of fasteners and fastener-receiving holes would substantially prevent moisture and debris from entering the interior of the vehicle. By eliminating the use of screws or other types of fasteners, efficient replacement of the boot assembly may be completed without requiring specialized tools and a plurality of replacement parts. Such a fastener-free boot assembly would substantially prevent the entrance of moisture into the vehicle interior, even after long periods of continuous operation. Such a boot assembly would also absorb the forces exerted by motion of the cab and sleeper units without developing potential leakage paths.

One type of prior art flexible boot currently commercially available is mounted to a frame provided on the opposed walls of the vehicle compartments without attachment screws. The frame typically includes an opening formed to receive the flexible boot, which has opposed, arrowhead-shaped edges. The arrowhead-shaped edge, which is formed for insertion into the opening on the flange, is forced into the opening to secure the boot to the adjacent cab and sleeper compartments.

The arrowhead-shaped boot edges secure the sealing boot between the opposed walls of the adjacent compartments to prevent the leakage of water into the vehicle interior. The barb portion, large enough in size to hold the boot in place, requires a substantial installation force. The edges must be hammered or otherwise forcefully driven into the openings in the frame member. The installation of the sealing boot is both manually taxing and time consuming. The installation process is impeded by the restricted work area provided between the cab and sleeper. Moreover, to prevent release of the boot from the frame during vehicle operation, the arrowhead barb must be completely retained within the frame.

During operation of the vehicle, debris, snow and ice will collect on top of the sealing boot. The operational forces and vibration of the vehicle, and the weight of the material collecting on the boot, gradually urge the arrowhead-shaped barbs from the openings of one or both of the mounting frames. The arrowhead-shaped edge must be reinserted to prevent water from leaking into the interior of the vehicle. If the boot is not replaced, moisture will enter the compartments, eventually damaging the vehicle interior. Since the sealing boot is difficult to install, the time required to replace the sealing boot will significantly detain the driver. When replacement of the boot is necessary, the arrowhead-shaped barb must be disengaged from the channel. Manually removing the arrowhead-shaped barb from the channel is at least as difficult and time consuming as the insertion process, as the barb must be forcefully removed from the channel.

Accordingly, it would be highly desirable to have a fastener-free flexible boot assembly which may be installed without requiring the application of a significant amount of force to mount the boot to the vehicle. Should the boot assembly inadvertently become disengaged during operation, such a boot should be capable of being rapidly and efficiently re-installed without the expenditure of substantial time and effort. Moreover, such a fastener-free, flexible boot should be formed to withstand the forces applied during operation of the vehicle, including the weight of the snow and ice collecting on top of the boot, and should remain substantially intact during operation even in severe weather conditions. Still further, a flexible boot which may be manually removed without substantial effort would significantly improve the ease with which the cab and sleeper may be disassembled or the boot replaced.

Accordingly, the present invention provides a flexible boot assembly for obstructing the passage of water into the vehicle interior. The present boot assembly is installed without the use of screws, other types of fasteners or specialized tools, and it is easy to install and manually remove. Moreover, the fastener-free boot assembly of the present invention can be used in a novel method for conveniently and efficiently installing the boot assembly.

A primary object of the present invention, therefore, is to provide a boot system for lining the passageway between compartments of a vehicle.

A further object of the present invention is to provide a boot assembly which may be easily installed.

Another object of the present invention is to provide a boot system which will withstand the operational forces of the vehicle, preventing disengagement of the boot assembly during operation of the vehicle.

Yet another object of the present invention is to provide a boot system which may be manually removed without difficulty.

An additional object of the present invention is to provide a boot system which will withstand the weight of materials collecting on an exterior surface of the boot assembly.

A more general object of the present invention is to provide a boot system which may be inexpensively manufactured and efficiently and conveniently assembled.

The boot assembly and method of the present invention have other objects and features of advantage which will become apparent from and are set forth in more detail in the description of the Best Mode for Carrying Out the Invention and the accompanying drawings.

DISCLOSURE OF THE INVENTION

The boot assembly of the present invention is particularly suitable for lining at least a portion of the passageway between two compartments of a vehicle such as a truck tractor cab and a sleeper box. The vehicle compartments have opposed side walls, formed with substantially aligned openings therein to allow movement of the driver and passengers between the compartments. A boot securement device is mounted proximate at least one of the openings, and includes a first shoulder and an opposed second shoulder. The first and second shoulders are formed for mounting the boot assembly to the securement device. In the preferred form the securement device is provided by extruded channels which extend around each of the compartment openings and are secured to the compartment walls.

The boot assembly of the present invention includes a boot body portion which is formed to extend between the securement devices. A retaining structure is provided on the body portion for mounting the boot body to the securement device. The retaining structure includes a first lip portion which is formed for substantially resistance-free insertion of the first lip portion into interengagement with the first shoulder on the securement device or channel. A second lip portion on the retaining structure of the boot, spaced apart from the first lip portion, is formed for resilient deformation. The second lip portion is further formed to be forced past the second shoulder on the securement device by rotating the retaining member about the interengaged first lip portion and the first shoulder until the second lip portion passes beyond and engages the second shoulder.

In another aspect of the present invention, a method for lining at least a portion of the periphery of a passageway between two compartments of a vehicle is provided. The compartments of the vehicle have opposed walls each with substantially axially aligned openings formed therein. A boot securement device is mounted proximate at least one of the openings, and preferably both openings, and includes a first shoulder and an opposed second shoulder to which the boot assembly is mounted. The method of the present invention includes the step providing a boot body with a retaining structure including a first lip portion and a spaced apart second lip portion formed for resilient deformation. In the present method the first lip portion of the boot body is inserted into interengagement with the first shoulder, and the second lip portion is then deformed, forcing the second lip portion past the second shoulder, by rotating the retaining structure about the first lip portion until the second lip portion passes beyond and resiliently engages the second shoulder.

BEST MODE OF CARRYING OUT THE INVENTION

Reference will now be made in detail to the preferred embodiments of the invention, which are illustrated in the accompanying Figures. Turning now to the drawings, wherein like components are designated by like reference numerals throughout the various figures, attention is direction to FIGS. 1 and 2.

Figure 1:
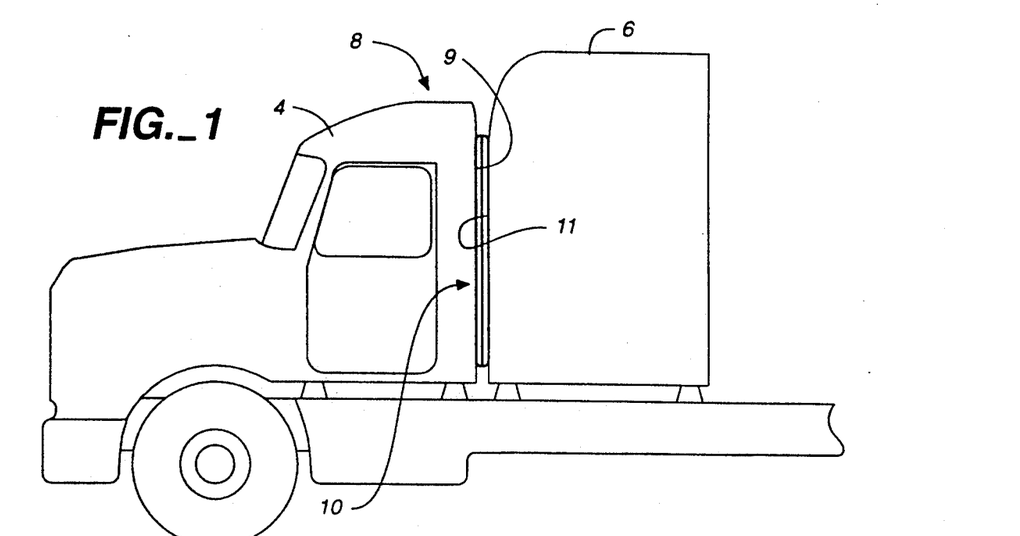
FIG. 1 is a side elevation view of a truck tractor cab and sleeper box having a boot assembly constructed in accordance with the present invention, shown installed therebetween.

The boot assembly of the present invention is particularly suitable for mounting to a vehicle between adjacent compartments, such as a cab 4 and a sleeper unit or box 6 of a truck 8. A boot assembly generally designated 10 lines at least a portion of the periphery of a passageway between cab 4 and sleeper compartment 6 of the vehicle. Boot assembly 10 is mounted to boot securement means which are secured to the opposed cab wall 9 and sleeper wall 11. One such boot securement means includes a pair of securement channels or devices 12 and 14 (FIG. 2) rigidly secured by fasteners or the like to walls 9 and 11 proximate substantially axially aligned openings (not shown) formed in each of the opposed walls. The openings provide the driver and/or passenger of the vehicle with access to both compartments of the vehicle. The passageway between the compartments, which is partially defined by the openings in the wall, may vary in size from that of a window through which objects may be passed to an opening of sufficient size for a person to move between the compartments. With door-sized, aligned openings, the driver and/or passenger may travel between the compartments without leaving the vehicle. Such passageways between cab and sleeper units are broadly well known in the industry.

In the present form, the boot assembly substantially surrounds and completely lines the periphery of the passageway between the adjacent compartments. By completely lining the passageway, the boot assembly prevents moisture from leaking between the opposed walls and into the interior of the vehicle. In some applications, however, the boot assembly need only extend partially around the passageway to provide the interior of the passenger compartment with sufficient protection from the elements.

Figure 2:
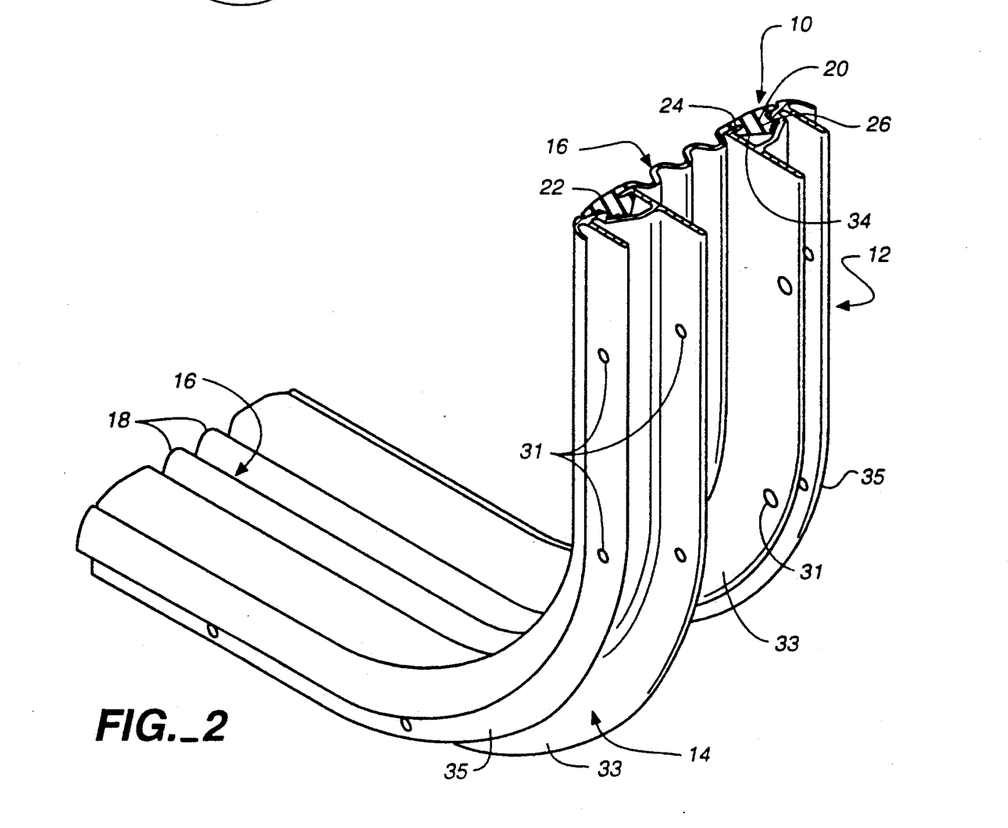
FIG. 2 is a fragmentary, enlarged, perspective view of a portion of the boot assembly and boot securement devices employed in the vehicle of FIG. 1.
Figure 3:
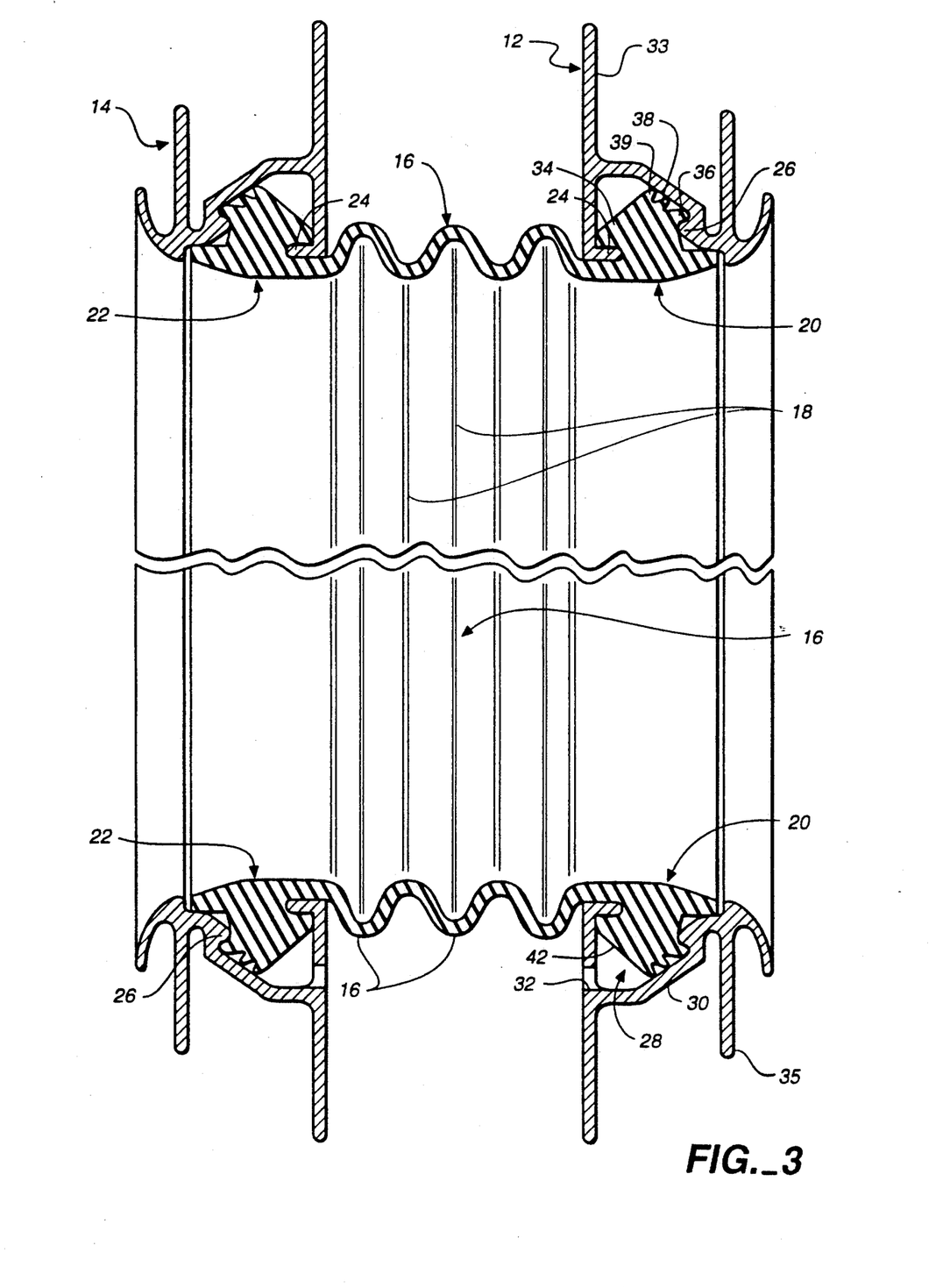
FIG. 3 is a half section view of the boot assembly of FIG. 1.

Turning to FIGS. 2 and 3, boot assembly 10 and securement devices 12 and 14, to which assembly 10 is mounted, will be described. Boot assembly 10 includes a boot body portion 16 which is formed to extend between the securement devices 12 and 14. The body portion 16 provides a lining for the passageway between the cab and sleeper units 4 and 6. In the present embodiment, the boot body is formed of a flexible, resilient material, and preferably includes a number of extensible pleats 18. The effective width of the boot body 16, which is the distance separating securement devices 12 and 14, may be increased and decreased by expanding and contracting the pleats of the boot body. During operation, the vehicle compartments will move or bounce in response to the jarring vibration of the chassis as the vehicle travels across uneven ground. With the provision of the rounded pleats 18, the boot body portion will expand and contract in response to the relative motion of cab 4 and sleeper units 6. Thus, boot assembly 10 of the present invention accommodates and to some degree helps absorb the forces and vibration generated by the movement of vehicle 8.

Boot assembly 10 includes retaining means for securing the boot body to the securement devices, such as a pair of retaining structures 20 and 22 provided along the spaced apart edges of boot body portion 16. The retaining structures or ends 20 and 22 of the boot are formed to provide for both easy installation and easy removal, allowing for disassembly of the cab and sleeper or replacement of boot assembly 10. The retaining ends 20 and 22 are mounted to securement devices 12 and 14 respectively, which are secured to opposed walls 9 and 11 of cab 4 and sleeper 6. The retaining boot ends releasably hold the boot assembly within the securement devices without the use of screws or other types of fasteners. The direction at which the installation and removal forces are applied to the retaining structures for the boot is different from the direction at which operational forces are applied to the boot. The retaining members, therefore, may be formed for easy installation and removal, while still substantially preventing inadvertent or stress-induced release of the boot assembly from the securement channels during operation of the vehicle.

Securement devices or channels 12 and 14 and retaining ends 20 and 22 now will be described in greater detail. In the present embodiment, securement channel 14 is substantially identical to, and reversed relative to, securement channel 12. Similarly, retaining ends 20 and 22 are similar, yet reversed relative to one another. It is to be understood, therefore, that the description of securement channel 12 and retaining end 20 also applies to channel or device 14 and retaining structure or end 22, respectively.

Figure 5:
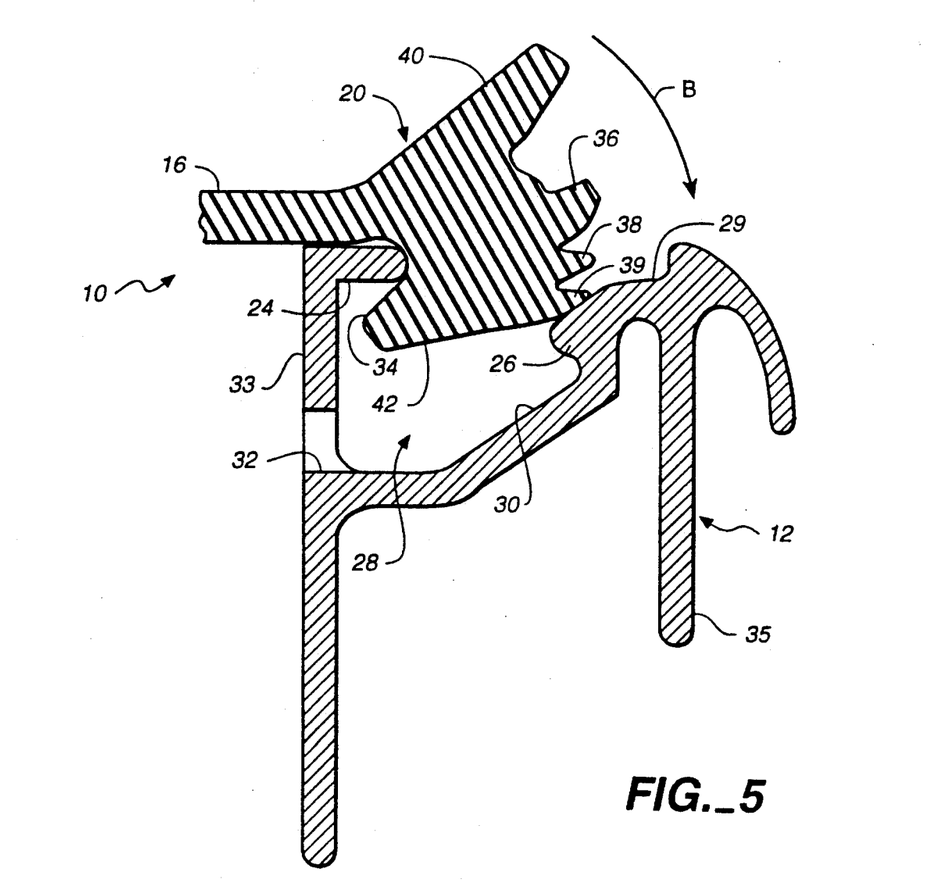
FIG. 5 is an enlarged, cross section view of the boot retaining structure of FIG. 4 and securement channel, with the retaining structure shown as it is being pivoted into full engagement with the securement channel.

Securement device 12 includes a first shoulder 24, best seen in FIG. 5, and an opposed second shoulder 26 which extend along opposite sides of a channel 28. Boot assembly 10 is mounted to the securement device 12 through the interengagement between retaining structure 20 and first and second shoulders 24 and 26. In the preferred form, the first and second shoulders 24 and 26 are provided by a pair of inwardly protruding flanges projecting partially across an elongate channel 28 formed in the securement device 12. First shoulder 24 is positioned and oriented relative to boot retaining end 20 to resist and substantially withstand the operational forces tending to pull the boot retaining end from the securement device.

A cam surface 29 is provided proximate second shoulder 26 for deforming boot retaining end 20 to enable the boot retaining end to pass to a position, best may be seen in FIG. 3, behind the second shoulder. The interengagement between the boot retaining structure and the first and second shoulders holds retaining structure or end 20 within channel 28, where the retaining end engages and seals against the securement device in a manner described in more detail below.

Securement devices 12 and 14 can advantageously be provided as extruded members with transverse apertures 31 formed in mounting flanges 33 and 35 for mounting the securement device to walls 9 and 11.

Retaining end 20 seals against the first and second shoulders 24 and 26, substantially preventing the ingress of moisture into elongate channel 28. Any moisture leaking between the interengaged boot retaining end 20 and shoulders 24 and 26, however, will collect within channel 28, where it is isolated from the interior of the vehicle. Securement device 12, therefore, also preferably includes moisture drainage means for directing moisture collecting between retaining member 20 and securement device 12 to an area outside of the passageway. One such moisture drainage means is provided by at least one drainage hole 32 formed in channel wall 33 (FIG. 5). In the preferred form, drainage hole 32 is formed in the lowermost portion of the securement device 12. Water collecting within the channel 28 gravitates to lowermost portion of the securement device and passes from the securement device through drainage hole 32.

Retaining end 20 includes a first lip portion 34 formed to interengage first shoulder 24, and a second lip portion 36 spaced apart from first lip portion 34 and formed to interengage second shoulder 26. Retaining structure 20 is primarily held within securement device 12 through the interengagement between first lip portion 34 and first shoulder 24. As such, the first lip portion is preferably larger in size and greater in depth than the second lip portion to provide increased resistance to forces which would otherwise pull the retaining member from the securement device. Lip portion 34 is therefore capable of withstanding the weight of material, such as debris, snow and ice, collecting on boot assembly 10.

Second lip portion 36 is formed to resiliently deform when urged against cam surface 29 and forced past second shoulder 26. In the present embodiment, the second lip portion is smaller and shallower than lip portion 34. Second lip portion 36 is of sufficient size, however, to cooperate with shoulder 26 and first lip 34 to withstand the lower operational forces exerted on the second lip portion. When removing the boot assembly, relatively smaller depth of second lip portion 36 allows lip 36 to be pivoted in the direction of arrow A in FIG. 4 to move lip 36 out of channel 28 and past the second shoulder 26.

In the preferred form of boot 10, at least one auxiliary finger 38, and as shown in the drawing, a second auxiliary finger 39, are provided and dimensioned to insure sealing of the boot retaining end with the securement channel or device. Thus, resilient fingers 38 and 39 press against channel-defining wall 30 and urge first lip portion 34 against first shoulder 24 and second lip portion 36 against second shoulder 26, and channel wall. Auxiliary lips 38 and 39 also seal against channel wall 30, providing additional protection against leakage.

Figure 4:
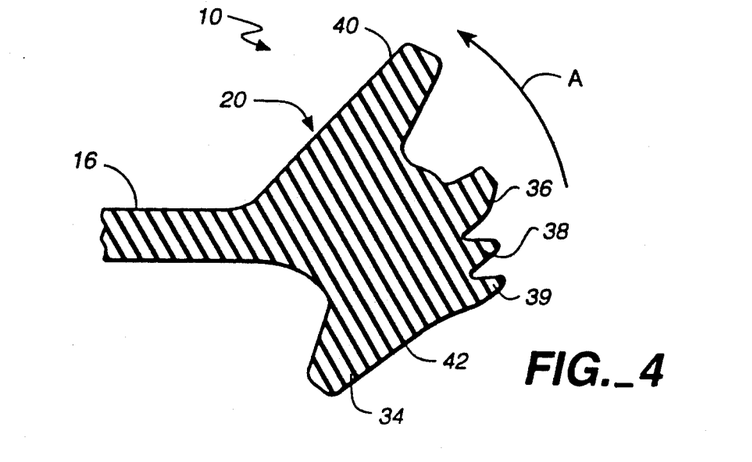
FIG. 4 is an enlarged, cross section view of a retaining structure of the boot assembly of FIG. 1, shown pivoted in a first direction facilitating insertion into the securement channel.

Retaining end or structure 20 also includes a surface 42 which facilitates installation of the retaining member, as is discussed in more detail below in relation to FIGS. 4 and 5, and directs any moisture seeping into the elongate channel 28 towards drainage hole 32. Thus, with the present invention, the passage of water into the interior of the vehicle is substantially prevented.

Boot assembly 10 is formed of a resiliently and elastically deformable material, such as natural or synthetic rubber. In the preferred embodiment, the retaining structures extend continuously along the spaced apart ends of boot body 16. With other forms of the present invention, however, the lip portions need not be provided continuously along the opposed ends or edges of boot body 16. The number of auxiliary lips also may be modified in other embodiments of the present invention.

The present invention provides a boot assembly which may be efficiently and effortlessly mounted to the opposed walls of a vehicle, but which will withstand substantial forces applied during operation of the vehicle. Turning to FIGS. 4 and 5, the installation of retaining members 20 and 22 into interengagement with securement devices 12 and 14 will be described in greater detail. To mount boot assembly 10 to securement device 12, retaining end 20 is first pivoted in one direction, generally indicated by arrow A in FIG. 4, to position first lip portion 34 for insertion into the elongate channel 28. The first lip portion is then slipped easily behind the first shoulder 24, shown in FIG. 5. At this stage, retaining structure 20 is partially installed with the first lip portion in interengagement with the first shoulder.

After inserting the first lip portion into the channel, retaining member 20 is pivoted in an opposite direction, as indicated by arrow B in FIG. 5. The retaining member is rotated in direction B about interengaged first lip portion 34 and first shoulder 24 until second lip portion 36 passes beyond and resiliently engages second shoulder 26. When the retaining structure is rotated in direction B, the second lip portion is deformed as it is forced across cam surface 29. The deformed lip portion 36 and auxiliary lip portions 38 and 39 are moved past the second shoulder until lip 36 is engaged with second shoulder 26 and lips 38 and 39 engage channel wall 30. The retaining member is then completely installed, (FIG. 3) with the first, second and auxiliary lip portions engaging and sealing with the first and second shoulders and the channel wall.

The retaining member 20 may be easily removed by first peeling boot flange portion 40 away from shoulder 26 in a direction opposite that indicated by arrow B. The shallower second lip portion 36 and auxiliary lip portions 38 and 39 are then resiliently deformed for passage beyond the second shoulder 26. Once auxiliary lips 38 and 39 have passed beyond shoulder 26, first lip portion 34 may be effortlessly extracted from channel 28. Thus, by simply reversing the installation steps the boot assembly 10 may be conveniently and effortlessly removed for replacement of the boot or disassembly of the cab and sleeper units.

As is apparent from the foregoing discussion, therefore, by inserting the lip portions one after the other. By inserting lip portion 34 into channel 28 prior to second lip portion 36, the first lip portion need not be significantly deformed during installation. The larger first lip portion 34 is formed and positioned to withstand the operational forces of the vehicle, while the smaller second lip portion 36 may be easily forced past second shoulder 26 during installation and urged in a reverse direction, with somewhat greater force, during removal. As is apparent from FIG. 3, the interengaged lip portions will also resist inadvertent removal from the securement device 12 when snow or ice collected on top of the boot body 16. Thus, the present invention provides a boot assembly which is easy to install and remove, yet will withstand the vibration of the chassis and other operational forces of the vehicle. The boot assembly will therefore remain securely in place until intentionally removed.

The present invention has been described in relation to a boot assembly having identical retaining members provided along both edges of the boot body. Securement devices 12 and 14 are also substantially identical, being formed for receiving the retaining structures 20 and 22. However, it is to be understood that providing only one end or edge of a boot body with a retaining structure described in the foregoing discussion is within the scope of the present invention.

What is claimed is:

1. A boot assembly for lining at least a portion of the periphery of a passageway between two compartments of a vehicle, said compartments having opposed walls with each of said walls having an opening therein, and a boot securement channel mounted proximate at least one of the openings and including a first shoulder and an opposed second shoulder, said first shoulder and said second shoulder protruding across said securement channel toward each other to define a space therebetween for mounting of said boot assembly in said securement channel, said boot assembly comprising:
    (a) a boot body portion formed to extend between said compartments; and
    (b) retaining means provided on said body portion for securing said body portion to said securement channel, said retaining means including a first lip portion formed for substantially resistance-free insertion of said first lip portion into interengagement with said first shoulder and a spaced apart second lip portion formed for resilient deformation and formed to be forced past said second shoulder by rotating said retaining means about the interengaged first lip portion and said first shoulder until said second lip portion passes beyond and resiliently interengages with said second shoulder, said retaining means having a width between the first lip portion and second lip portions greater than said space between said first shoulder and second shoulder to mechanically interlock said first lip portion and second lip portion in interengagement with said first shoulder and said second shoulder respectively.

2. The boot assembly of claim 1 wherein,
said first lip portion and said second lip portion are formed to require substantially less force to urge said second lip portion past said second shoulder during rotation of said retaining means than to disengage said first lip portion from said securement means when said second lip portion is interengaged with said second shoulder.

3. The boot assembly of claim 1 wherein,
said first and second lip portions are formed to secure said retaining means to said securement channel with a force greater than the operational forces on said boot assembly during operation of said vehicle.

4. The boot assembly of claim 1 wherein,
said retaining means includes at least one auxiliary lip portion proximate and inwardly of said second lip portion.

5. The boot assembly of claim 1 wherein,
said second lip portion is further formed to be forced past said second shoulder for removal of said retaining means from said securement channel by rotating said retaining means about the interengaged first lip portion and said first shoulder.

6. The bottom assembly of claim 1 wherein,
said first lip portion is greater in size than said second lip portion; and
said space in said channel for receiving said bottom assembly faces inwardly toward said passageway.

7. A boot assembly for at least partially lining a passageway between two compartments of a vehicle, said compartments having opposed walls with each of said walls having an opening therein, said boot assembly comprising:
(a) boot securement means provided as an elongate channel mounted proximate at least one of the openings and said channel including a first shoulder and an opposed second shoulder provided by inwardly protruding flanges;
(b) a boot body portion formed to extend substantially between said opposed walls and at least partially around the periphery of said openings;
(c) retaining means provided on said body portion to mount said body portion to said securement means, said retaining means including a first lip portion and a spaced apart second lip portion, said first lip portion being formed for insertion of said first lip portion into interengagement with a flange providing said first shoulder by pivoting said retaining means in one direction, said second lip portion being formed for resilient deformation and formed to be forced past a flange providing said second shoulder by pivoting said retaining means in an opposite direction about the interengaged first lip portion.

8. The boot assembly of claim 7 wherein,
at least one of said first lip portion and said second lip portion is formed to substantially seal with at least one of said first shoulder and said second shoulder respectively to substantially prevent passage of moisture into said passageway from an area surrounding said vehicle.

9. The boot assembly of claim 7 wherein,
said retaining means includes at least one auxiliary lip portion proximate and inwardly of said second lip portion.

10. The boot assembly of claim 9 wherein,
said auxiliary lip portion is formed to engage and seal against said channel.

11. The boot assembly of claim 7 wherein,
said first lip portion and said second lip portion are formed to require substantially less force to urge said second lip portion past said second shoulder during rotation of said retaining means than to disengage said first lip portion from said securement means when said second lip portion is interengaged with said second shoulder.

12. The boot assembly of claim 7 wherein,
said securement means is provided by an elongate channel facing inwardly toward said passageway.

13. The boot assembly of claim 7 wherein,
said securement means includes a surface proximate said second shoulder formed to deform said second lip portion for passage beyond said second shoulder when said retaining means is pivoted in said opposite direction.

14. The boot assembly of claim 7 wherein,
said securement means includes moisture drainage means for directing moisture collecting between said retaining means and said securement means to an area outside said passageway.

15. A method for lining at least a portion of the periphery of a passageway between two compartments of a vehicle, said compartments having opposed walls with each of said walls having an opening therein, and boot securement means mounted proximate at least one of the openings and including a first shoulder and an opposed spaced apart second shoulder for mounting of said boot assembly thereto, said first shoulder and said second shoulder extending in a direction toward each other and a direction substantially parallel to said passageway said method comprising the steps of:
(a) providing a boot body portion formed to extend between said securement means and having retaining means provided on said body portion including a first lip portion and a spaced apart second lip portion formed for resilient deformation, first lip portion and said second lip portion extending in a direction substantially parallel to said passageway;
(b) inserting said first lip portion into interengagement with said first shoulder;
(c) deforming said second lip portion to force said second lip portion past said second shoulder by rotating said retaining means about the interengaged first lip portion until said second lip portion passes beyond and resiliently engages said second shoulder.

16. The method of claim 15 wherein,
said inserting step includes pivoting said retaining means in one direction to insert said first lip portion into interengagement with said second first shoulder and
said rotating step includes pivoting said retaining means in an opposite direction to insert said second lip portion into interengagement with said second shoulder.

17. The method of claim 15 wherein, said deforming step includes moving said second lip portion along a surface of said securement means proximate said second shoulder to deform said second lip portion for passage beyond said second shoulder.

18. The method of claim 15 wherein,
said deforming step includes forming a seal between at least one of said first lip portion and said first shoulder and at least one of said second lip portion and said second shoulder respectively to substantially prevent the passage of moisture into said passageway from an area of said vehicle surrounding said vehicle.

19. The method of claim 15, and the step of directing moisture collecting between said securement means and said retaining means to an area outside said passageway.

* * * * *

UNITED STATES PATENT AND TRADEMARK OFFICE
CERTIFICATE OF CORRECTION

PATENT NO. : 5,280,984

DATED : January 25, 1994

INVENTOR(S) : Jeffrey F. Paul and David M. Yun

It is certified that error appears in the above-identified patent and that said Letters Patent is hereby corrected as shown below:

Column 9, line 32, claim 6, delete "bottom" and insert --boot--;

Column 9, line 35, claim 6, delete "bottom" and insert --boot--; and

Column 10, line 62, claim 16, delete "second".

Signed and Sealed this

Twenty-eighth Day of June, 1994

Attest:

BRUCE LEHMAN

*Attesting Officer*  *Commissioner of Patents and Trademarks*